US008570445B2

(12) United States Patent
Han

(10) Patent No.: US 8,570,445 B2
(45) Date of Patent: Oct. 29, 2013

(54) BROADCAST RECEIVING APPARATUS AND METHOD FOR PERFORMING MANUAL FINE TUNING

(75) Inventor: Kum-yon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1546 days.

(21) Appl. No.: 11/592,980

(22) Filed: Nov. 6, 2006

(65) Prior Publication Data

US 2007/0143780 A1 Jun. 21, 2007

(30) Foreign Application Priority Data

Dec. 19, 2005 (KR) .......................... 10-2005-0125092

(51) Int. Cl.
*H04N 5/50* (2006.01)
(52) U.S. Cl.
USPC .......................... 348/731; 348/569; 348/570
(58) Field of Classification Search
USPC .......... 348/731–732, 733, 563, 569, 734, 725;
348/570, 528, 552–553, 588–589;
348/714–715; 725/25–31, 38–40;
455/186.1, 192.3, 182.3, 183.2
See application file for complete search history.

(56) References Cited

U.S. PATENT DOCUMENTS

| 5,428,405 | A | * | 6/1995 | Lee | 348/731 |
| 6,360,367 | B1 | | 3/2002 | Yamamoto | |
| 6,597,408 | B1 | * | 7/2003 | Oak et al. | 348/731 |
| 7,117,514 | B2 | * | 10/2006 | Han | 725/25 |
| 7,210,158 | B1 | * | 4/2007 | Forler | 725/31 |
| 7,222,353 | B1 | * | 5/2007 | Forler | 725/27 |

FOREIGN PATENT DOCUMENTS

| JP | 06-081062 B2 | 10/1994 |
| JP | 10-178593 A | 6/1998 |
| JP | 2000-134554 A | 5/2000 |
| JP | 2001-16565 A | 1/2001 |
| KR | 10-2000-0003813 A | 1/2000 |
| WO | 99/31881 A1 | 6/1999 |

* cited by examiner

*Primary Examiner* — Trang U Tran
(74) *Attorney, Agent, or Firm* — Sughrue Mion, PLLC

(57) ABSTRACT

A broadcast receiving apparatus and a method for performing manual fine tuning (MFT) are provided. The broadcast receiving apparatus includes a signal processor which processes a broadcast signal of a tuned channel; a image generator which generates a manual fine tuning (MFT) image on which an optimal frequency of the tuned channel is to be tuned; a display which displays the MFT image; and a controller which, if a signal requesting adjustment is received, determines whether the broadcast signal is blocked and whether to re-tune the tuned channel using an adjusted optimal frequency based on a result of the blocking determination. The method includes processing a broadcast signal of a tuned channel; receiving a signal requesting adjustment; determining whether the broadcast signal is blocked; and determining whether to re-tune the channel using an adjusted optimal frequency based on a result of the determining.

18 Claims, 4 Drawing Sheets

BROADCAST RECEIVING APPARATUS AND METHOD FOR PERFORMING MANUAL FINE TUNING

CROSS-REFERENCE TO RELATED APPLICATIONS

This application claims priority from Korean Patent Application No. 10-2005-0125092 filed Dec. 19, 2005, in the Korean Intellectual Property Office, the entire disclosure of which is incorporated herein by reference.

BACKGROUND OF THE INVENTION

1. Field of the Invention

Apparatuses and methods consistent with the present invention relate to manual fine tuning (MFT), and more particularly, to selectively performing re-tuning during MFT depending on whether viewing of a broadcast program is blocked.

2. Description of the Related Art

Violence (V)-chips set viewing restrictions on individual viewers according to program viewing classes. Parents can prevent children from viewing by setting permissions through the V-chips. Thus, the V-chips are also called parental locks. Televisions (TVs) with V-chips determine whether program viewing classes of received broadcast programs are higher than viewing classes pre-set by users or lower than the viewing classes. If the received program viewing classes are higher than the pre-set viewing classes, the TVs intercept the corresponding programs to regulate indiscreet program viewing which may be harmful to children.

If a received sensitivity of a broadcast program is deteriorated, a viewer will see unclear images on a TV. Thus, the TV provides an MFT function to the viewer so as to address the problem of the viewing of the unclear images.

The MFT function is to detect an optimal frequency having a highest receive sensitivity from a bandwidth of a viewed channel so as to provide clear images to a viewer.

However, in a case where the viewer performs MFT on a channel having a restricted viewing class to detect an optimal frequency, a conventional TV performs re-tuning using the optimal frequency, receives a blocked broadcast signal, and processes the broadcast signal even though it is blocked by a V-chip.

Thus, when a restricted viewer such as a preschool child or a minor performs the MFT on a channel having a restricted viewing class, a TV performs re-tuning to a constant frequency according to the result of the MFT to relieve a broadcast signal from being blocked. As a result, the underage viewer can view a desired broadcast program without restriction of a genre of the broadcast signal or limits to the viewing periods of time. In other words, the V-chip permissions are circumvented.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a broadcast receiving apparatus and method for performing MFT by which a viewing blocked broadcast program is not re-tuned during MFT so as to maintain blocking of viewing.

According to an aspect of the present invention, there is provided a broadcast receiving apparatus including: a signal processor which processes a broadcast signal of a tuned channel; a image generator which generates a manual fine tuning (MFT) image on which an optimal frequency of the channel is to be tuned; a display which displays the MFT image; and a controller which, if a signal requesting adjustment of the optimal frequency of the channel is received, determines whether the broadcast signal is blocked and determines whether to re-tune the tuned channel using the adjusted optimal frequency based on a result of the determination of whether the broadcast signal is blocked.

If the signal requesting adjustment of the optimal frequency of the channel is received, the controller may control the image generator to generate the MFT image and controls the display to display the MFT image and then determine whether the broadcast signal is blocked.

If it is determined that the broadcast signal is blocked, the controller may generate one of an unwatchable image and a blue screen to control the signal processor and to maintain blocking of the broadcast signal.

If it is determined that the broadcast signal is blocked, the controller may control the image generator to generate an information message and the display to display the information message.

The information message may indicate that MFT cannot be performed on the channel.

If it is determined that the broadcast signal is not blocked and the optimal frequency is adjusted through the displayed MFT, the controller may control the tuner to re-tune the channel based on the adjusted optimal frequency.

If it is determined that the broadcast signal is not blocked, the controller may control the image generator and the display to generate and display the MFT, and if the optimal frequency is tuned through the displayed MFT image, control the tuner to re-tune the tuned channel based on the adjusted optimal frequency.

The broadcast receiving apparatus may further include a storage which stores the adjusted optimal frequency according to the channel.

The signal requesting adjustment of the optimal frequency of the channel may be received from an external device.

According to another aspect of the present invention, there is provided a broadcast receiving method including: processing a broadcast signal of a tuned channel; receiving a signal requesting adjustment of an optimal frequency of the channel; determining whether the broadcast signal is blocked; and, determining whether to re-tune the channel using an adjusted optimal frequency based on a result of the determining whether the broadcast signal is blocked.

After receiving the output signal, the broadcast receiving method may further include generating an MFT image on which the optimal frequency of the channel is adjusted; and displaying the MFT image.

If it is determined that the broadcast signal is blocked, the broadcast receiving method may further include generating one of an unwatchable image and a blue screen to maintain blocking of the broadcast signal.

The generating of the one of the unwatchable screen and the blue screen may include generating an information message.

The information message may indicate that MFT cannot be performed on the channel.

If it is determined that the broadcast signal is blocked, the broadcast receiving method may further include: tuning the optimal frequency through the displayed MFT image; and re-tuning the channel based on the tuned optimal frequency.

If it is determined that the broadcast signal is not blocked, the broadcast receiving method may further include generating and displaying the MFT image on which the optimal frequency of the channel is to be adjusted; tuning the optimal frequency through the displayed MFT screen; and re-tuning the channel based on the adjusted optimal frequency.

After adjusting the optimal frequency through the displayed MFT image and tuning the optimal frequency through the displayed MFT image, the broadcast receiving method may further include storing the adjusted optimal frequency according to the channel.

The signal requesting the adjustment of the optimal frequency of the channel may be received from an external device.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
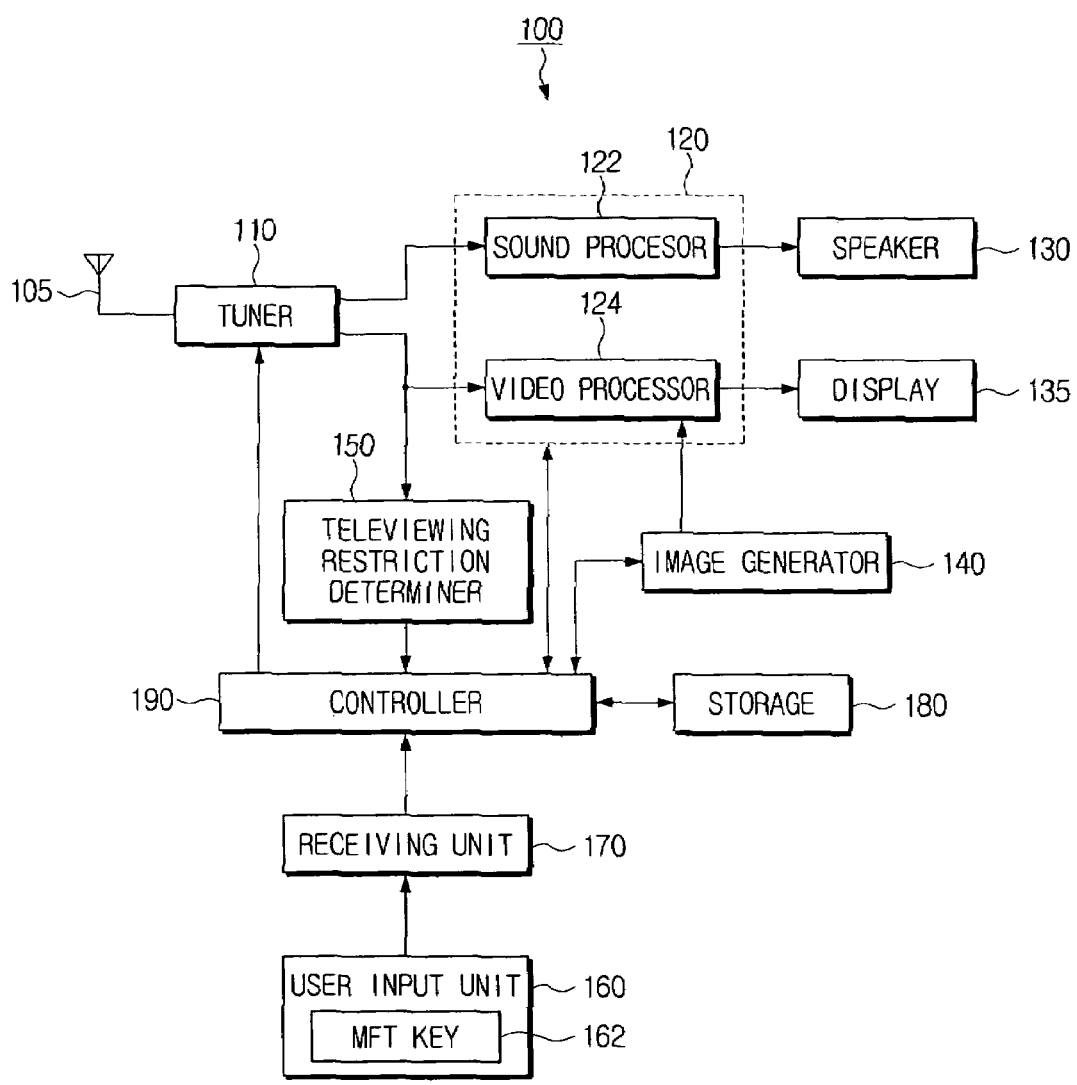
FIG. 1 is a schematic block diagram of a broadcast receiving apparatus for performing MFT according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description such as a detailed construction and elements are provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a schematic block diagram of a broadcast receiving apparatus for performing MFT according to an exemplary embodiment of the present invention. Referring to FIG. 1, a broadcast receiving apparatus 100 includes an antenna 105, a tuner 110, a signal processor 120, a speaker 130, a display 135, an image generator 140, a viewing restriction determiner 150, a user input unit 160, a receiving unit 170, a storage 180, and a controller 190.

The broadcast receiving apparatus 100 receives a broadcast signal to provide a viewable sound and/or video signal to a viewer, and has a function such that the viewer may set a viewing class of a program. The program may be predetermined.

The tuner 110 tunes a channel of a plurality of broadcast signals received through the antenna 105 using a selection control signal of the controller 190 so as to generate a video intermediate frequency signal and a sound intermediate frequency signal.

The signal processor 120 processes the broadcast signal on the channel tuned by the tuner 110 as a viewable signal. For this purpose, the signal processor 120 includes a sound processor 122 and a video processor 124.

The sound processor 122 processes the sound intermediate frequency signal provided from the tuner 110 to generate audible sound data and provides the audible sound data to the outside through the speaker 130.

The video processor 124 processes the video intermediate frequency signal provided from the tuner 110 to generate displayable video data. The displayable video data is provided to the display 135 to be displayed to the outside.

If the channel selected by the tuner 110 is a channel having a viewing restricted class, the video processor 124 generates a blue screen or an unwatchable screen and provides the blue screen or the unwatchable screen to the display 135.

The video processor 124 overlaps an MFT image 200 (shown in FIG. 2) generated by the image generator 140 that will be described later with a video signal being output to the display 135 or on the blue screen and then outputs the overlapped MFT image 200 to the display 135.

The image generator 140 realizes the MFT image 200 and outputs the MFT image 200 to the video processor 124. The MFT image 200 is a graphic user interface for manually performing MFT on an optimal frequency of a currently used channel. If a signal for requesting an entrance into an MFT mode is received from the user input unit 160, the image generator 140 realizes the MFT image 200 shown in FIG. 2A or FIG. 2B.

Figure 2A:
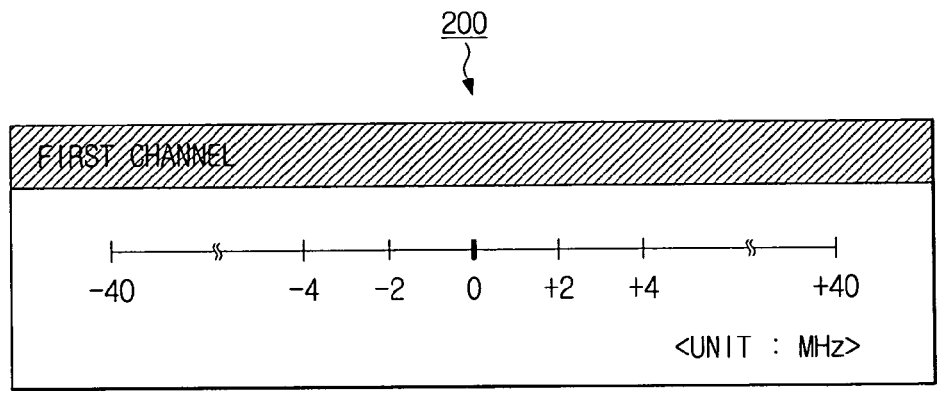
FIGS. 2A and 2B are a view illustrating an MFT image realized by a image generator shown in FIG. 1 according to an exemplary embodiment of the present invention.

Referring to FIG. 2A, the MFT image 200 realizes a bandwidth of a channel, which may be predetermined, selected by the tuner 110, for example, a No. 1 channel, based on a constant frequency of 0 MHz, and a reference bar is moved in units of frequency to the left or right by manipulations of left and right direction keys (not shown) of the user input unit 160. The units of frequency may be predetermined. For example, if a user selects the right direction key (not shown) of the user input unit 160 one time, the image generator 140 realizes the MFT image 200 on which the reference bar moves by 2 MHz to the right. The user detects an optimal frequency of a channel having the highest receive sensitivity through such a manipulation.

Figure 2B:
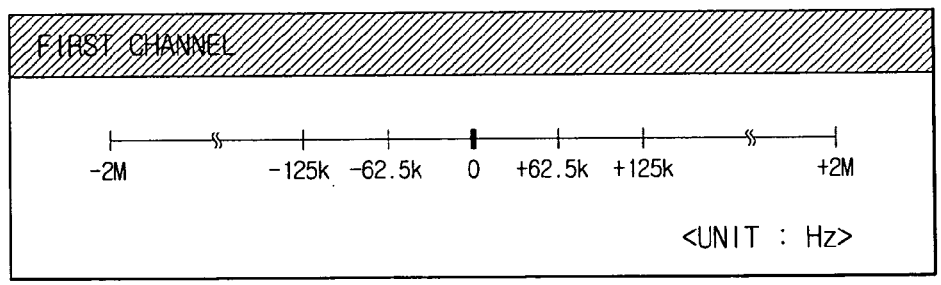

Also, referring to FIG. 2B, the bandwidth of the selected No. 1 channel is −2 MHz~+2 MHz, and the reference bar is moved in units of 62.5 KHz to the left or the right by manipulations of the left and right direction keys (not shown) of the user input unit 160. For example, if a user selects the right direction key (not shown) of the user input part 160 one time, the image generator 140 realizes MFT image 200 on which the reference bar moves by 62.5 KHz to the right. The user detects an optimal frequency of a channel having the highest receive sensitivity through such a manipulation.

Figure 3:
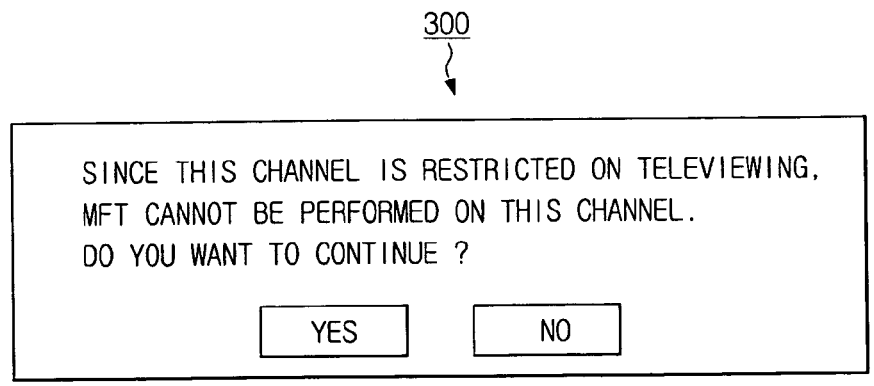
FIG. 3 is a view illustrating an information message realized by the image generator shown in FIG. 1 according to an exemplary embodiment of the present invention.

Also, if a viewing restriction class is set with respect to a channel on which MFT is requested, the image generator 140 generates an information message 300 on On Screen Display (OSD)-processes shown in FIG. 3 and outputs the information message 300 to the video processor 124.

Referring to FIG. 1 again, the viewing restriction determiner 150 decodes a broadcast signal of a selected channel to determine whether a viewing restriction class is set with respect to the broadcast signal. The setting of the restriction class for the broadcast signal may be realized with a V-chip. If the viewing restriction class is set with respect to the broadcast signal, the viewing restriction determiner 150 outputs state information "0" to the controller 190. If the viewing restriction class is not set with respect to the broadcast signal, the viewing restriction determiner 150 outputs state information "1" to the controller 190.

The user input unit 160 may include a plurality of numeral keys, a plurality of direction keys, a plurality of confirmation keys, and the like to select functions supported by the broadcast receiving apparatus 100 and applies a signal corresponding to a key selected by a viewer to the controller 190. The user input unit 160 may be installed in a main body of the broadcast receiving apparatus 100 or may be realized as a remote controller.

In an exemplary embodiment of the present invention, the user input unit 160 includes an MFT key 162. The MFT key 162 transmits a signal for requesting an entrance into an MFT mode for manually detecting an optimal frequency of a channel.

The receiving unit 170 receives the signal from the user input unit 160 and then outputs the signal to the controller 190.

The storage 180 stores, according to a channel, the optimal frequency on which MFT has been performed on the MFT image 200 by the user. In other words, the storage 180 stores an optimal frequency for each channel. If the channel is re-tuned after a period of time, which may be predetermined, the tuner 110 re-tunes the channel based on the optimal frequency of the channel stored in the storage 180. The storage 180 may be a non-volatile data output random-access memory (NVRAM), an electrically erasable programmable read-only memory (EEPROM), a flash memory, or other similar memory.

The controller 190 controls and manages the overall operation of the broadcast receiving apparatus 100 according to the signal output from the user input unit 160 through a key input of the user and a control program stored in a read-only memory (ROM) (not shown).

In an exemplary embodiment of the present invention, the controller 190 controls the tuner 110 to tune a channel corresponding to the selection control signal, and the signal processor 120 to process a broadcast signal of the tuned channel.

If the state information "0" of the selected channel is provided from the viewing restriction determiner 150, the controller 190 outputs video and sound blocking control signals to the video processor 124 and the sound processor 122, respectively. The video blocking control signal blocks the processed video signal and generates the blue screen or the unwatchable screen so as to output the blue screen or the unwatchable screen to the display 135, and the sound blocking control signal blocks the processed sound signal.

If the signal for requesting the entrance into the MFT mode is received from the MFT key 162, the controller 190 enters into the MFT mode and then determines whether the tuned channel may be re-tuned in consideration of whether viewing of the tuned channel is restricted, i.e., blocked.

In more detail, if the controller 190 receives the signal for requesting the entrance into the MFT mode, the controller 190 controls the video processor 124 and the display 135 to generate and display the MFT image 200 as shown in FIG. 2A or FIG. 2B. The controller 190 determines whether a current channel is blocked. If the current channel is blocked, the controller 190 temporally stores state information "true" in the storage 180. If the current channel is not blocked, the controller 190 temporally stores state information "false" in the storage 180.

If the optimal frequency is adjusted through the manual manipulation of the user input unit 160 and the MFT image 200, the controller 190 re-determines whether the current channel is blocked. In other words, the controller 190 checks state information temporally stored in the storage 180 and determines whether a channel corresponding to the optimal frequency is re-tuned based on the check result.

If it is determined that the current channel is blocked, the controller 190 controls the storage 180 to store the adjusted optimal frequency according to the current channel and the video processor 124, to maintain blocking. If the blocked channel is relieved from being viewing restricted and requested to be re-tuned after a period of time, which may be predetermined, the controller 190 controls the tuner 110 to tune the channel based on the optimal frequency stored in the storage 180.

If the broadcast signal of the channel is output to the speaker 130 and the display 135, the controller 190 controls the tuner 110 to re-tune the channel based on the adjusted optimal frequency and the signal processor 120 to process the broadcast signal of the re-tuned channel.

If the signal for requesting the entrance into the MFT mode is received from the user input unit 160, before the controller 190 enters into the MFT mode, the controller 190 may determine whether a current tuned channel is re-tuned in consideration of whether viewing of the current tuned channel is restricted.

In detail, if it is determined that viewing restriction is set with respect to the channel on which the MFT is requested and thus the channel is currently blocked, the controller 190 controls the image generator 140 and the video processor 124 to generate and display the information message 300 indicating that a channel is a viewing restricted channel and that MFT cannot be performed, and inquiring whether the viewer wants to continue, as shown in FIG. 3.

If "Yes" is selected for the information message 300, the controller 190 controls the image generator 140 and the video processor 124 to overlap the MFT image 200 as shown in FIG. 2A or FIG. 2B with a blocking screen. If the optimal frequency is tuned by the user input unit 160, the controller 190 controls the storage 180 to store the tuned optimal frequency for the channel of which viewing has been blocked.

If "No" is selected for the information message 300, the controller 190 controls the signal processor 120 to maintain blocking of the broadcast signal.

If the channel on which MFT is requested is a general broadcast program, the controller 190 controls the image generator 140 and the video processor 124 to generate the MFT image 200 shown in FIG. 2A or 2B and display the MFT image 200 on the display 135. If the optimal frequency is adjusted by the user input unit 160, the controller 190 controls the storage 180 to store the adjusted optimal frequency for the channel, and the tuner 110 to re-tune the channel based on the adjusted optimal frequency.

Figure 4:
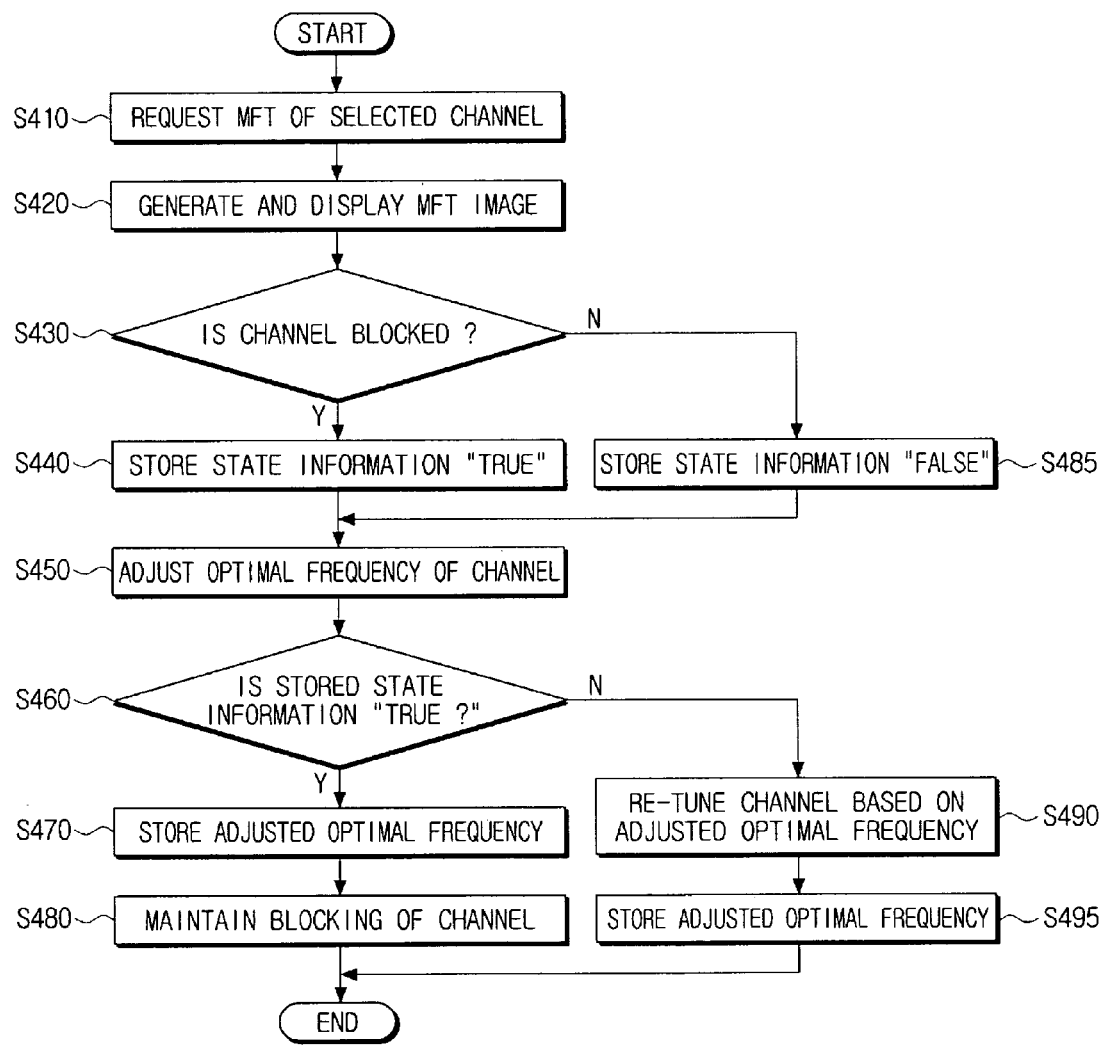
FIG. 4 is a flowchart of a broadcast receiving method for performing MFT according to an exemplary embodiment of the present invention.

FIG. 4 is a flowchart of a broadcast receiving method for performing MFT according to an exemplary embodiment of the present invention. Referring to FIGS. 1 through 4, if a signal for requesting to perform an MFT on a tuned channel is received from the MFT key 162, the controller 190 controls the video processor 124 and the display 135 to generate and display the MFT image 200, as shown in FIG. 2A or 2B, in operations S410 and S420.

In operation S430, the controller 190 determines whether a current channel is blocked. If the controller 190 determines that the current channel is blocked, the controller 190 temporally stores state information "true" in the storage 180 in operation S440.

An optimal frequency is adjusted through a manual manipulation of the user input unit 160 and the MFT image 200 in operation S450. The controller 190 checks state information temporally stored in the storage 180 to determine whether the current channel is blocked in operation S460. In other words, because the state information temporally stored in the storage 180 is "true," the controller 190 determines in operation S460 that the current channel is blocked.

In operation S470, the controller 190 controls the storage 180 to store the optimal frequency adjusted in operation S450 for the channel. In operation S480, the controller 190 controls the video processor 124 to maintain the blocking. In other words, the controller 190 controls the video processor 124 to generate a blue screen or an unwatchable screen and output the blue screen or the unwatchable screen to the display 135.

If the blocked channel is relieved from being viewing restricted and is requested to be re-tuned, the controller 190 controls the tuner 110 to tune the channel based on the optimal frequency stored in the storage 180.

If the controller 190 determines that the current channel is not blocked in operation S430, the controller 190 temporally stores state information "false" in the storage 180 in operation S485 and then performs operations S450 and 460. The state information temporally stored in operation S485 is "false," so the controller 190 determines in operation S460 that the current channel is not blocked but processed by the signal processor 120 to be output to the speaker 130 and the display 135.

In operation S490, the controller 190 controls the tuner 110 to re-tune the channel based on the optimal frequency adjusted in operation S450. In operation S495, the controller 190 controls the storage 180 to store the optimal frequency adjusted in operation S450 according to the channel.

In the above-described method, if an entrance into an MFT mode is requested by the MFT key 162, the entrance into the MFT mode is performed, and a determination is made as to whether a current channel is blocked so as to perform MFT on the current channel. Also, the MFT is performed to adjust an optimal frequency of the channel regardless of whether the current channel is blocked, blocking of the current channel is maintained, and a channel that is not blocked is re-tuned so as to provide a program having improved receive sensitivity. In other words, a user can perform MFT on a blocked channel and maintain blocking of the channel using the above-described method.

Figure 5:
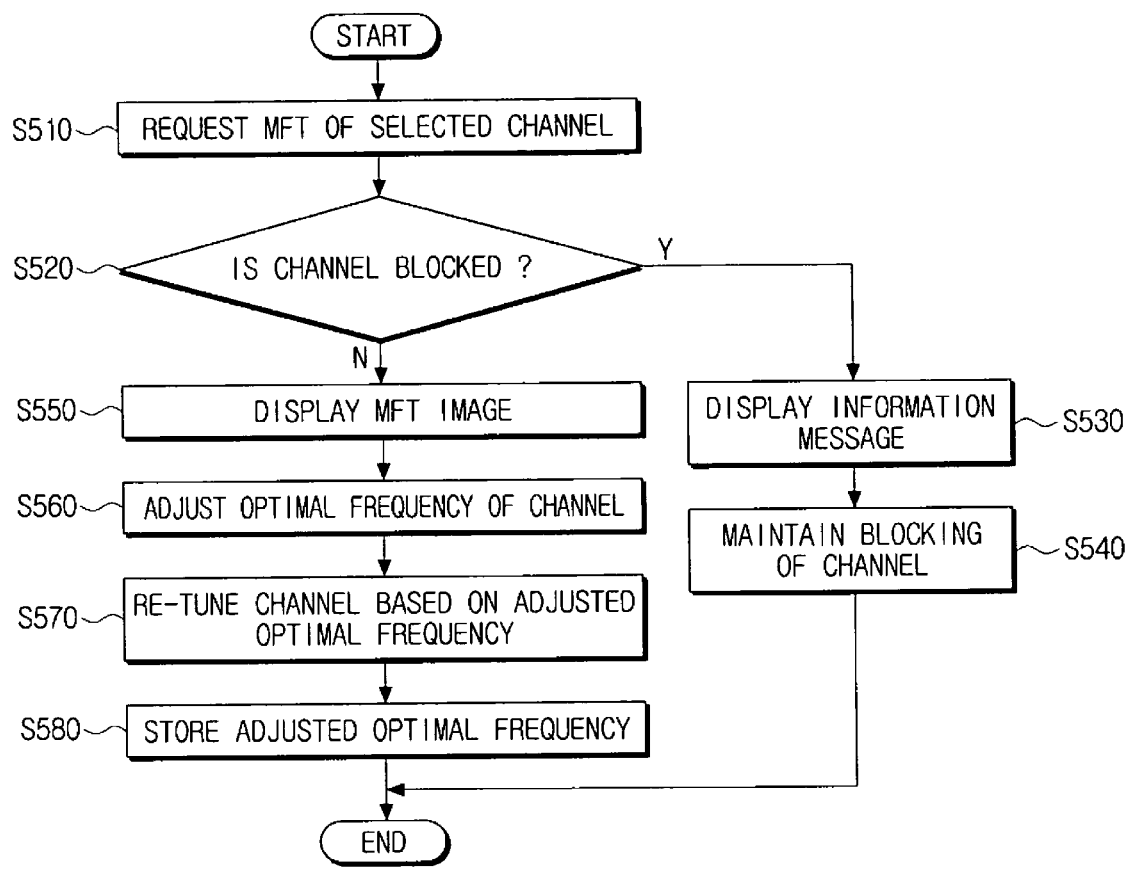
FIG. 5 is a flowchart of a broadcast receiving method for performing MFT according to another exemplary embodiment of the present invention.

FIG. 5 is a flowchart of a broadcast receiving method for performing MFT according to another exemplary embodiment of the present invention. Referring to FIGS. 1 through 3 and 5, if an entrance into an MFT mode is requested by the MFT key 162, before the controller 190 enters into the MFT mode, the controller 190 may determine whether a channel is re-tuned in consideration of whether a currently tuned channel is viewing restricted.

In more detail, in operation S510, a signal for requesting to perform an MFT on a tuned channel is received from the MFT key 162. In operation S520, the controller 190 determines whether the tuned channel is blocked.

If the controller 190 determines that the tuned channel is blocked in operation S520, the controller 190 controls the image generator 140 and the video processor 124 to generate and display the information message 300, as shown in FIG. 3, in operation S530. In other words, if it is determined that the tuned channel is viewing restricted, the controller 190 displays a message on the display to inform a viewer that the MFT cannot be performed.

In operation S540, the controller 190 controls the signal processor 120 to maintain blocking of the current channel, generate a blue screen, and display the blue screen on the display 135.

If the controller 190 determines that the tuned channel is not blocked in operation S520, i.e., a broadcast signal is processed by the signal processor 120, the controller 190 temporally stores state information "false" in the storage 180 and controls the image generator 140 and the video processor 124 to generate the MFT image 200 as shown in FIG. 2A or 2B and display the MFT image 200 on the display 135 in operation S550.

In operation S560, an optimal frequency is adjusted through the MFT image 200 and a manipulation of the user input unit 160. The controller 190 controls the tuner 110 to re-tune the channel based on the adjusted optimal frequency in operation S570 and controls the storage 180 to store the adjusted optimal frequency for the current channel in operation S580.

The above-described method provides the message as shown in FIG. 3 in operations S530 and S540, but this should not be considered as limiting. In other words, the method may not provide the message as shown in FIG. 3, but controls MFT so that MFT is not always performed if the selected channel is a viewing restricted class.

In the above-described method, a signal for requesting an entrance into an MFT mode may be output from an external device such as a computer or an additional remote controller or integrated remote controller and then input into the broadcast receiving apparatus 100. Also, in a case where the signal is output according to a reservation, the present invention can perform the above-described operation.

As described above, in a broadcast receiving apparatus and method for performing MFT according to exemplary embodiments of the present invention, a channel of which images and sounds are blocked can be prevented from being relieved from being viewing restricted during MFT due to a viewing restriction function. Thus, a harmful broadcast can be prevented from being provided to a restricted viewer. Also, a V-chip can maintain its own function. In other words, a viewing blocked broadcast program can be re-tuned during MFT while maintaining viewing blocking. Thus, a broadcast program that is not viewing blocked can be re-tuned so as to provide a broadcast program having improved receive sensitivity.

In addition, an entrance into an MFT mode cannot be executed for the viewing blocked broadcast program during the MFT to display an information message and to provide convenience to a user.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A broadcast receiving apparatus comprising:
a signal processor which processes a broadcast signal of a pre-tuned channel;
an image generator which generates a manual fine tuning (MFT) image for performing manual fine tuning of an optimal frequency of a pre-tuned channel;
a display which displays the MFT image; and
a controller which, when a signal requesting manual fine tuning of the a pre-tuned channel is received, determines whether the pre-tuned channel is blocked and, if it is determined that the pre-tuned channel is blocked, controls the image generator to generate an information message and the display to display the information message and maintain blocking of the pre-tuned channel, wherein the information message indicates that MFT cannot be performed on the channel.

2. The broadcast receiving apparatus of claim 1, wherein after the signal is received, the controller controls the image generator to generate the MFT image and controls the display to display the MFT image.

3. The broadcast receiving apparatus of claim 1, wherein the controller generates one of an unwatchable image and a blue screen as the information message.

4. The broadcast receiving apparatus of claim 1, wherein the controller controls the tuner to re-tune the tuned channel based on an adjusted optimal frequency of the manual fine tuning, if it is determined that the pre-tuned channel is not blocked and the optimal frequency is adjusted through the displayed MFT.

5. The broadcast receiving apparatus of claim 1, wherein the controller controls the image generator and the display to generate and display the MFT image, if it is determined that the pre-tuned channel is not blocked, and controls the tuner to re-tune the pre-tuned channel based on an adjusted optimal frequency of the manual fine tuning, if the optimal frequency is adjusted through the displayed MFT.

6. The broadcast receiving apparatus of claim 5, further comprising a storage which stores the adjusted optimal frequency according to the channel.

7. The broadcast receiving apparatus of claim 1, wherein the signal requesting manual fine tuning is received from an external device.

8. The broadcast receiving apparatus of claim 1, wherein the controller generates one of an unwatchable image and a blue screen to control the signal processor and to maintain blocking of the broadcast signal, if it is determined that the pre-tuned channel is blocked.

9. A broadcast receiving method comprising:
processing a broadcast signal of a pre-tuned channel;
receiving a signal requesting manual fine tuning (MFT) of an optimal frequency of the pre-tuned channel;
determining whether the pre-tuned channel is blocked; and
if it is determined that the pre-tuned channel is blocked, generating an information message and displaying the information message and maintaining blocking of the pre-tuned channel,
wherein the information message indicates that MFT cannot be performed on the channel.

10. The broadcast receiving method of claim 9, further comprising:
after receiving the signal requesting MFT, generating an MFT image on which the optimal frequency of the channel is adjusted; and
displaying the MFT image.

11. The broadcast receiving method of claim 9, wherein generating the information message comprises:
generating one of an unwatchable image and a blue screen, if it is determined that the pre-tuned channel is blocked.

12. The broadcast receiving method of claim 10, further comprising, if it is determined that the pre-tuned channel is not blocked:
adjusting the optimal frequency through the displayed MFT image; and
re-tuning the pre-tuned channel based on the adjusted optimal frequency.

13. The broadcast receiving method of claim 9, further comprising, if it is determined that the broadcast signal is not blocked:
generating and displaying the MFT image on which the optimal frequency of the pre-tuned channel is to be adjusted;
adjusting the optimal frequency through the displayed MFT image; and
re-tuning the pre-tuned channel based on the adjusted optimal frequency.

14. The broadcast receiving method of 13, further comprising, after adjusting the optimal frequency through the displayed MFT image and re-tuning the pre-tuned channel, storing the adjusted optimal frequency according to the pre-tuned channel.

15. The broadcast receiving method of claim 9, wherein the signal requesting MFT is received from an external device.

16. The broadcast receiving method of claim 9, wherein generating the information message comprises:
generating one of an unwatchable image and a blue screen to maintain blocking of the broadcast signal, if it is determined that the pre-tuned channel is blocked.

17. A broadcast receiving apparatus comprising:
a signal processor which processes a broadcast signal of a channel;
an image generator which generates a manual fine tuning (MFT) image;
a display which displays the MFT image; and
a controller which, when a signal requesting manual fine tuning of a pre-tuned channel is received, determines whether the broadcast signal of the pre-tuned channel is blocked, performs manual fine tuning to adjust an optimal frequency of the pre-tuned channel, and if it is determined that the broadcast signal is blocked, maintains blocking of the pre-tuned channel.

18. The broadcast receiving apparatus of claim 17, wherein if it is determined that the broadcast signal is not blocked, the controller retunes the pre-tuned channel based on the adjusted optimal frequency.

* * * * *